United States Patent
Dow

(10) Patent No.: US 10,195,950 B2
(45) Date of Patent: Feb. 5, 2019

(54) WIRELESS POWER TRANSMISSION DEVICE HAVING USER INTERFACE STRUCTURE AND METHOD FOR CONTROLLING THE SAME

(71) Applicant: HYUNDAI MOBIS CO., LTD., Seoul (KR)

(72) Inventor: Young-Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 556 days.

(21) Appl. No.: 14/814,918

(22) Filed: Jul. 31, 2015

(65) Prior Publication Data

US 2016/0031333 A1 Feb. 4, 2016

(30) Foreign Application Priority Data

Aug. 4, 2014 (KR) .................. 10-2014-0099806

(51) Int. Cl.
*B60L 11/18* (2006.01)
*H02J 50/90* (2016.01)

(52) U.S. Cl.
CPC ......... *B60L 11/182* (2013.01); *B60L 11/1829* (2013.01); *B60L 11/1838* (2013.01); *B60L 2230/16* (2013.01); *H02J 50/90* (2016.02); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01)

(58) Field of Classification Search
None
See application file for complete search history.

(56) References Cited

U.S. PATENT DOCUMENTS

| | | | |
|---|---|---|---|
| 9,371,007 B1* | 6/2016 | Penilla | B60L 11/1848 |
| 9,751,419 B2* | 9/2017 | Kwon | B60L 11/1829 |
| 9,796,280 B2* | 10/2017 | McCool | B60L 11/182 |
| 9,931,954 B2* | 4/2018 | Sankaran | B60L 11/182 |
| 2011/0175569 A1* | 7/2011 | Austin | B60L 11/1824 320/109 |
| 2012/0249065 A1* | 10/2012 | Bissonette | B60L 11/184 320/109 |
| 2013/0278212 A1* | 10/2013 | Kai | B60L 11/182 320/108 |
| 2013/0335015 A1* | 12/2013 | Ichikawa | H02J 7/025 320/108 |
| 2014/0285141 A1* | 9/2014 | Lee | H02J 7/025 320/108 |
| 2016/0001668 A1* | 1/2016 | Ichikawa | H02J 5/005 307/9.1 |

FOREIGN PATENT DOCUMENTS

KR 10-2014-0061337 A 5/2014

* cited by examiner

*Primary Examiner* — Jared Fureman
*Assistant Examiner* — James Evans
(74) *Attorney, Agent, or Firm* — NSIP Law

(57) ABSTRACT

A wireless power transmission device may include a power transmitting module installed outside a vehicle for transmitting power, a power receiving module installed on the vehicle for receiving power from the power transmitting module, and a user interface module configured to control a position of the vehicle and the power transmitting and receiving modules so as to transmit power from the power transmitting module to the power receiving module.

20 Claims, 10 Drawing Sheets

RELATED ART

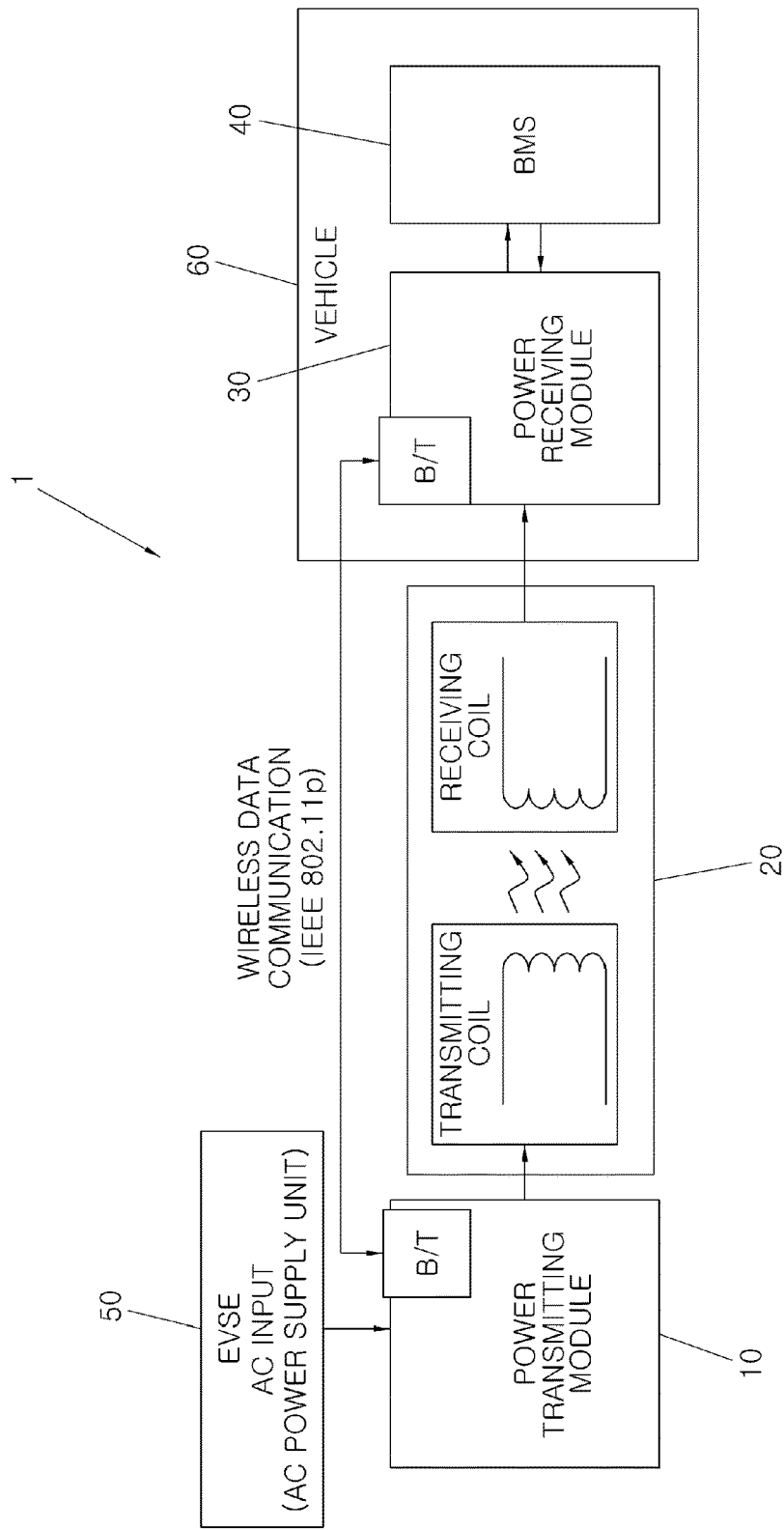

WIRELESS POWER TRANSMISSION DEVICE HAVING USER INTERFACE STRUCTURE AND METHOD FOR CONTROLLING THE SAME

CROSS-REFERENCE(S) TO RELATED APPLICATIONS

This application claims the benefit under 35 USC 119(a) of Korean Patent Application No(s). 10-2014-0099806 filed on Aug. 4, 2014, in the Korean Intellectual Property Office, the entire disclosure of which is incorporated herein by reference in its entirety.

BACKGROUND

1. Field

Embodiments of the present application relate to a wireless power transmission device and a method for controlling the same, capable of allowing a user to easily charge a vehicle having a high-voltage battery, by providing an interface between a power receiving module for wireless power transmission and the user and performing data communication between the power receiving module and the interface.

2. Description of Related Art

Vehicles using high-voltage batteries are currently developed by vehicle makers of various countries, and thus various technologies for charging the vehicles using the high-voltage batteries are researched. Particularly, technologies for charging the vehicles using the high-voltage batteries by wireless have been internationally researched and their standards are about established. A study on the internationally discussed technologies for charging the vehicles using the high-voltage batteries by wireless is now proceeding.

However, a communication protocol between a wireless power transmission device, a power transmitting module, and a power receiving module, and a communication protocol between the power receiving module and a BMS are only defined in the current technologies for charging the vehicles using the high-voltage batteries by wireless. That is, there is no technology on an interface connecting the wireless power transmission device to the user and a communication protocol defining wireless data communication between the wireless power transmission device and the interface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission device may include a power transmitting module installed outside a vehicle for transmitting power, a power receiving module installed on the vehicle for receiving power from the power transmitting module, and a user interface module configured to control a position of the vehicle and the power transmitting and receiving modules so as to transmit power from the power transmitting module to the power receiving module.

The device may be configured such that information transmitted from the power receiving module to the user interface module comprises state information of the power receiving module and charging-related state information.

The device may be configured such that information transmitted from the user interface module to the power receiving module comprises state information of the user interface module, a charging-related command, operation-related information of a matching assistance module, and charging-related setting information.

The device may be configured such that the user interface module displays a position of a transmitting coil connected to the power transmitting module for transmitting power and a position of a receiving coil connected to the power receiving module for receiving power, and guides a movement path of the vehicle so as to allow a user to drive the vehicle and match the transmitting coil with the receiving coil.

The device may be configured such that the user interface module provides an initial screen through which charging by wireless power transmission is selected and an execution screen through which the wireless power transmission is executed.

The device may be configured such that the user interface module is a navigation device for a vehicle.

The device may further include a matching assistance module configured to move the vehicle using position information of a transmitting coil connected to the power transmitting module for transmitting power and position information of a receiving coil connected to the power receiving module for receiving power, so as to match the transmitting coil with the receiving coil.

The device may be configured such that information transmitted from the power receiving module to the matching assistance module comprises state information of the power receiving module, charging progression state information, vehicle position-related information, and vehicle movement-related check information.

The device may be configured such that information transmitted from the matching assistance module to the power receiving module comprises state information of the matching assistance module, charging progression state information, vehicle position-related command and information, and vehicle movement progression state-related information.

The device may be configured such that the matching assistance module automatically moves the vehicle to match a position of the transmitting coil with a position of the receiving coil.

The device may be configured such that the matching assistance module is a PAS (Parking Assistance System).

The device may be configured such that comprising a display unit for displaying a charging progression state by the wireless power transmission device, wherein the display unit is a cluster.

The device may be configured such that information transmitted from the power receiving module to the display unit comprises charging progression state information and state information of the power receiving and transmitting modules.

The device may be configured such that information transmitted from the power transmitting module to the power receiving module comprises communication state information of the power transmitting module, a vehicle information-related command of the power transmitting module, charging-related state information, a charging-related command, a Battery Management System (BMS) information-related command, a power receiving module information-related command, and information of the power transmitting module, and information transmitted from the power receiving module to the power transmitting module comprises communication state information of the power receiving module, a vehicle information-related response of the power receiving module, charging-related state information, BMS control-related information, power receiving module output-related information, and vehicle and ID-related information.

In another general aspect, a method for controlling a wireless power transmission device may include performing a charging request input in which a user interface module receives a charging request for a vehicle, performing a coil matching in which the vehicle is moved using position information of a transmitting coil installed outside of the vehicle and position information of a receiving coil installed on the vehicle so as to match the transmitting coil with the receiving coil, performing a charging start in which the user interface module receives a charging start request for the vehicle; and performing a charging finish in which the charging of the vehicle is finished.

The method may include a process wherein, in the performing of the coil matching, a matching assistance module moves the vehicle using the position information of the transmitting coil and the position information of the receiving coil, so as to match the transmitting coil with the receiving coil, or the user interface module displays a position of the transmitting coil and a position of the receiving coil and guides a movement path of the vehicle equipped with the receiving coil, so as to match the transmitting coil with the receiving coil.

The method may include a process wherein, in the performing coil matching, the position of the transmitting coil is automatically input by the matching assistance module or is manually input by the user interface module.

The method may include a process wherein the performing coil matching comprises performing a power receiving module state confirmation in which the matching assistance module receives state information of a power receiving module from the power receiving module, performing a vehicle position confirmation in which the matching assistance module receives a position of the vehicle from the power receiving module, performing a vehicle movement in which the vehicle is moved, performing a matching position determination in which the matching assistance module receives a position of the moving vehicle from the power receiving module so as to determine whether the vehicle is at a position at which the transmitting coil is matched with the receiving coil, and performing a matching completion in which, when the vehicle is at the position at which the transmitting coil is matched with the receiving coil, the movement of the vehicle is stopped.

The method may include a process wherein, in the performing of the matching position determination, when the vehicle is not at the position at which the transmitting coil is matched with the receiving coil, the performing of the vehicle movement is performed again.

The method may further include performing a charging power setting, in which the user interface module receives charging power or charging time for the vehicle, before the performing the charging start, wherein in the performing of the charging finish, the user interface module receives a charging finish request for the vehicle.

Other features and aspects will be apparent from the following detailed description, the drawings, and the claims.

BRIEF DESCRIPTION OF THE DRAWINGS

FIG. 2 is a block diagram illustrating a wireless power transmission device according to the related art.

DETAILED DESCRIPTION

Figure 1A:
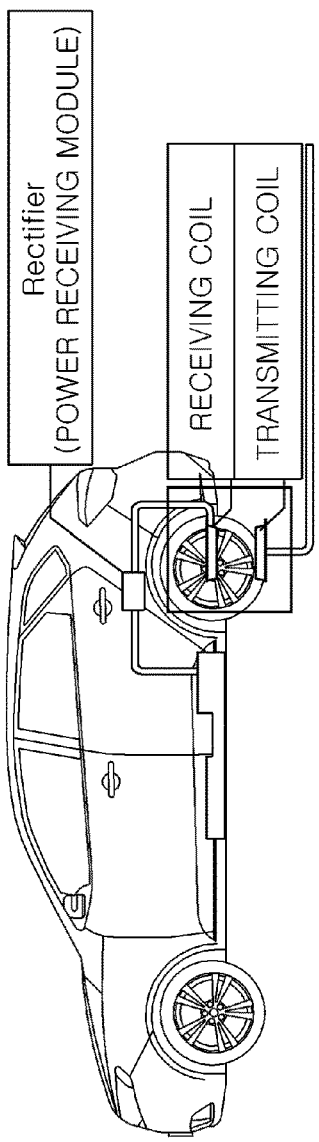
FIGS. 1A and 1B are a conceptual view and a block diagram illustrating a wireless power transmission device according to the related art.

It is to be noted that technical terms used in the specification are used for describing specific embodiments and do not limit the present invention. In addition, unless indicated otherwise in the specification, it is to be understood that all the technical terms used in the specification are construed as meaning as those that are generally understood by those who skilled in the art and as excessively comprehensive meanings and excessively reduced meanings. Furthermore, the accompanying drawings are provided to easily understand the technical spirit of the present application disclosed in the present specification, and therefore the technical spirit is not limited to the accompany drawings. Therefore, it is to be construed that the accompanying drawings include all modifications and replacements included in the technical spirit and the technical scope disclosed in the present specification.

Referring to FIGS. 1A to 3, a wireless power transmission device 1 for a vehicle includes a power transmitting module 10 supplied with a voltage supply 50 of AC 220V on the ground to switch a transmitting coil, a transmitting/receiving pickup coil 20 transferring energy of the power transmitting module to a power receiving module by resonance, a power receiving module 30 switching the received energy such that the energy is adapted for a high-voltage battery of a vehicle, and a BMS 40.

The power transmitting module 10 installed on a road or a floor in a parking lot and the power receiving module 30 installed at a lower portion of the vehicle perform wireless data communication depending on communication protocols, so as to perform wireless charging start and wireless charging finish operations.

In more detail, in the wireless data communication between the power transmitting module 10 and the power receiving module 30, information provided to the power receiving module 30 by the power transmitting module 10 depends on communication protocols shown in the following Tables 1 to 4.

TABLE 1

| ID | DATA | PERIOD | DATA BYTE | DATA BIT | STATE VALUE (Example) | FROM | TO | CONTENT |
|---|---|---|---|---|---|---|---|---|
| XX1 | CF_COMMUNICATION_SET | 100 ms | 0 | 0 | 1 | Power Transmitting Module | Power Receiving Module | Communication state set-up (communication start) |
| | CF_POLLING STATE | | | 1 | 1 | | | Message for periodically monitoring power receiving module state |
| | CR_ID_CHK | | 2 | 16 | ABCDE | | | ID confirmation message |
| | CR_CHARGER_NUM_CHK | | 4 | 32 | 1234 | | | Charger number confirmation message |
| | CR_CUR_FAULT_CHK | | 6 | 48 | 1011 | | | Current fault information confirmation message |
| | CAR_NUM | 1 s | 7 | 56 | 0~255 | | | Vehicle identification number |

In the above Table 1, the XX1 is information transmitted from the power transmitting module and is data about the communication state between the power transmitting module and the power receiving module, the power receiving module confirmation message, vehicle information, etc.

TABLE 2

| ID | DATA | PERIOD | DATA BYTE | DATA BIT | STATE VALUE (Example) | FROM | TO | CONTENT |
|---|---|---|---|---|---|---|---|---|
| XX2 | CF_CONTROL_START | 100 ms | 0 | 0 | 1 | Power Transmitting Module | Power Receiving Module | Wireless charging start |
| | CR_TX_STATE | | 1 | 8 | 0~4 | | | 0: Normal, 1: Abnormal, 2: Standby, 3: Power transmission, 4: power transmitting module state value transmission |
| | CR_RX_STATE | | 2 | 16 | 0~4 | | | 0: Normal, 1: Abnormal, 2: Standby, 3: Power transmission, 4: power transmitting module state value request |
| | CR_TX_FAULT | | 4 | 32 | 1111 | | | Power transmitting module fault state message |
| | CR_RX_FAULT | | 6 | 48 | 1011 | | | Power receiving module fault state message |

In the above Table 2, the XX2 is information transmitted from the power transmitting module and is data about charging progression state information, etc.

TABLE 3

| ID | DATA | PERIOD | DATA BYTE | DATA BIT | STATE VALUE (Example) | FROM | TO | CONTENT |
|---|---|---|---|---|---|---|---|---|
| XX3 | BMS_INFO_REQ | 100 ms | 0 | 0 | 1 | Power Transmitting Module | Power Receiving Module | BMS information request |
|  | BMS_INFO_RESP_ACK |  | 1 | 8 | 1 |  |  | BMS information normal response message |
|  | BMS_INFOR_RESP_NAK |  |  | 9 | 1 |  |  | BMS information abnormal response message |
|  | RX_CHAR_INFO_REQ |  | 2 | 16 | 1 |  |  | Power receiving module information request |
|  | RX_CHAR_INFO_RESP_ACK |  | 3 | 24 | 1 |  |  | Power receiving module information normal response message |
|  | RX_CAR_INFO_RESP_NAK |  |  | 25 | 1 |  |  | Power receiving module information abnormal response message |

In the above Table 3, the XX3 is information transmitted from the power transmitting module and is data about the BMS and power receiving module-related information request, etc.

TABLE 4

| ID | DATA | PERIOD | DATA BYTE | DATA BIT | STATE VALUE (Example) | FROM | TO | CONTENT |
|---|---|---|---|---|---|---|---|---|
| XX4 | CR_TX_AC_VOL | 100 ms | 0 | 0 | 0~500 | Power Transmitting Module | Power Receiving Module | Power transmitting module input voltage |
|  | CR_TX_AC_CUR |  | 1 | 8 | 0~50 |  |  | Power transmitting module input current |
|  | CR_TX_PSFB_IN_CUR |  | 2 | 16 | 0~50 |  |  | Power transmitting module full bridge input voltage |
|  | CR_TX_PSFB_IN_VOL |  | 3 | 24 | 0~500 |  |  | Power transmitting module full bridge input current |
|  | CR_TX_TEMP |  | 5 | 40 | −40~150 |  |  | Power transmitting module temperature |

In the above Table 4, the XX4 is information transmitted from the power transmitting module and is data about the power transmitting module information, etc.

Furthermore, in the wireless data communication between the power transmitting module 10 and the power receiving module 30, information provided to the power transmitting module 10 by the power receiving module 30 depends on communication protocols shown in the following Tables 5 to 8.

TABLE 5

| ID | DATA | PERIOD | DATA BYTE | DATA BIT | STATE VALUE (Example) | FROM | TO | CONTENT |
|---|---|---|---|---|---|---|---|---|
| XX1 | CF_CONTROLLABLE | 100 ms | 0 | 0 | 1 | Power Receiving Module | Power Transmitting Module | Wireless charging start possible state information message |
|  | CF_COMMUNICATION_OK |  |  | 1 | 1 |  |  | Communication state normality |
|  | CF_RESP_ACK |  |  | 2 | 1 |  |  | Normal response message |
|  | CF_RESP_NAK |  |  | 3 | 1 |  |  | Abnormal response message |
|  | CR_TX_STATE |  | 1 | 8 | 0~4 |  |  | 0: Normal, 1: Abnormal, 2: Standby, 3: Power transmission, 4: power receiving module state value transmission |
|  | CR_RX_STATE |  | 2 | 16 | 0~4 |  |  | 0: Normal, 1: Abnormal, 2: Standby, 3: Power transmission, 4: power receiving module state value transmission |
|  | CR_TX_FAULT |  | 4 | 32 | 1111 |  |  | Power transmitting module fault state message |
|  | CR_RX_FAULT |  | 6 | 48 | 1011 |  |  | Power receiving module fault state message |

In the above Table 5, the XX1 is information transmitted from the power receiving module and is data about the communication state between the power transmitting module and the power receiving module, etc.

TABLE 6

| ID | DATA | PERIOD | DATA BYTE | DATA BIT | STATE VALUE (Example) | FROM | TO | CONTENT |
|---|---|---|---|---|---|---|---|---|
| XX2 | BMS_CUR_INFOR | 100 ms | 0 | 0 | 0~20 | Power Receiving Module | Power Transmitting Module | BMS control current message |
|  | BMS_VOL_INFO |  | 2 | 16 | 0~500 |  |  | BMS control voltage message |
|  | BMS_FAULT_STATE |  | 4 | 32 | 1011 |  |  | BMS fault information message |
|  | BMS_TEMP |  | 6 | 48 | −40~150 |  |  | BMS temperature message |

In the above Table 6, the XX2 is information transmitted from the power receiving module and is data about the BMS information, etc.

TABLE 7

| ID | DATA | PERIOD | DATA BYTE | DATA BIT | STATE VALUE (Example) | FROM | TO | CONTENT |
|---|---|---|---|---|---|---|---|---|
| XX3 | CR_RX_DC_VOL | 100 ms | 1 | 8 | 0~500 | Power Receiving Module | Power Transmitting Module | Power receiving module output voltage message |
| | CR_RX_DC_CUR | | 2 | 16 | 0~50 | | | Power receiving module output current message |
| | CR_RX_TEMP | | 4 | 32 | −40~150 | | | Power receiving module temperature message |

In the above Table 7, the XX3 is information transmitted from the power receiving module and is data about the power receiving module-related information, etc.

TABLE 8

| ID | DATA | PERIOD | DATA BYTE | DATA BIT | STATE VALUE (Example) | FROM | TO | CONTENT |
|---|---|---|---|---|---|---|---|---|
| XX4 | CR_ID_CHK | 100 ms | 2 | 16 | ABCDE | Power Receiving Module | Power Transmitting Module | ID confirmation message |
| | CR_CHARGER_NUM_CHK | | 4 | 32 | 1234 | | | Charger number confirmation message |
| | CR_CUR_FAULT_CHK | | 6 | 48 | 1011 | | | Current fault information confirmation message |
| | CAR_NUM | 1 s | 7 | 56 | 0~255 | | | Vehicle identification number |

In the above Table 8, the XX4 is information transmitted from the power receiving module and is data about the vehicle information, the ID confirmation, etc.

The power receiving module 30 and the BMS 40 which are mounted at the lower portion of the vehicle perform an exchange of information related to a state of charge, a voltage, a current, a command value, etc., so that the charging operation is stably performed.

In more detail, in the wireless data communication between the power receiving module 30 and the BMS 40, the information mutually provided by the power receiving module 30 and the BMS 40 depends on communication protocols of the following Tables 9 and 10.

TABLE 9

| ID | DATA | PERIOD | DATA BYTE | DATA BIT | STATE VALUE (Example) | FROM | TO | CONTENT |
|---|---|---|---|---|---|---|---|---|
| XX5 | CF_OBC_Rdy | 100 ms | 0 | 0 | 1 | Power Receiving Module | BMS | Ready (CAN communication inside charger, control board ready command) |
| | CF_OBC_Wrn | | | 1 | 1 | | | Setting at the time of occurrence of fault situation other than OBC fault |
| | CF_OBC_Flt | | | 2 | 1 | | | Fault (setting at the time of occurrence of OBC fault situation) |
| | CF_OBC_CharMode | | | 3 4 | 3 | | | Charging mode (CC/CV/CP) |
| | CF_OBC_Connection | | | 5 | 1 | | | Charging connector fastening state |
| | CF_OBC_ChgFinished | | | 6 | 1 | | | Charging finish (value: 1 finish) |
| | CF_OBC_PowerEnaStat | | | 7 | 1 | | | charging possible ready state notification |

TABLE 9-continued

| ID | DATA | PERIOD | DATA BYTE | BIT | STATE VALUE (Example) | FROM | TO | CONTENT |
|---|---|---|---|---|---|---|---|---|
| | CR_OBC_FltCode | | 1 | 8 | 0~255 | | | Charger error code (diagnosis communication code) |
| | CR_OBC_Temp | | 2 | 16 | 40~120° C. | | | Internal temperature of charger |
| | CR_OBC_Effi | | 3 | 24 | 0~110% | | | Charger efficiency |
| | CR_OBC_MaxPwr_W | | 4 | 32 | 50 W criteria | | | Maximum chargeable power value |
| | CR_OBC_MaxCur_A | | 5 | 40 | 0~150 A | | | Maximum chargeable current value |
| | CR_OBC_MaxVolt_V | | 6 | 48 | 0~1100 V | | | Maximum chargeable voltage value |
| | | | 7 | 56 | | | | |

In the above Table 9, the XX5 is information transmitted from the power receiving module and is data about internal state information of the power receiving module, charging-related state information, etc.

TABLE 10

| ID | DATA | PERIOD | DATA BYTE | BIT | STATE VALUE (Example) | FROM | TO | CONTENT |
|---|---|---|---|---|---|---|---|---|
| XX1 | CF_BMS_RdyForOBC | 100 ms | 0 | 0 | 1 | BMS | Power Receiving Module | Ready (CAN communication inside vehicle, ready command) |
| | CF_BMS_WrnForOBC | | | 1 | 1 | | | Warning (setting at the time of occurrence of fault situation other than BMC fault) |
| | CF_BMS_FaultForOBC | | | 2 | 1 | | | Fault (setting at the time of occurrence of fault situation which corresponds to no charging) |
| | CF_BMS_MainRlyOnStatForOBC | | | 3 | 1 | | | High-voltage relay on/off state at the time of charging |
| | CF_BMS_PwrLmtForOBC | | | 4 | 3 | | | charging power limit |
| | CF_BMS_AbnorChg | | | 6 | 1 | | | State of Charge (0: Normal, 1: Abnormal) |
| | CF_BMS_OBCChgFinishedForOBC | | | 7 | 1 | | | Charging finish state |
| | CF_BMS_SoForOBC_Pc | | 1 | 8 | 5~90% | | | Battery SOC (%) |
| | CR_BMS_CharRemainedTime_min | | 2 | 16 | 0~600 min | | | Remaining time for charging (remaining time against full charging) |
| | | | 3 | 24 | | | | |
| | CR_BMS_OBCcmdCur_A | | 4 | 32 | 0~150 A | | | CC mode constant current value |
| | | | 5 | 40 | | | | |
| | CR_BMS_OBCCmdVolt_V | | 6 | 48 | 0~1100 V | | | CV mode constant voltage value |
| | | | 7 | 56 | | | | |

In the above Table 10, the XX1 is information transmitted from the BMS and is data about internal state information of the BMS, charging-related state information, etc.

Hereinafter, a wireless power transmission device for a vehicle according to a first embodiment of the present application will be described in more detail with reference to the accompanying drawings.

Figure 4:
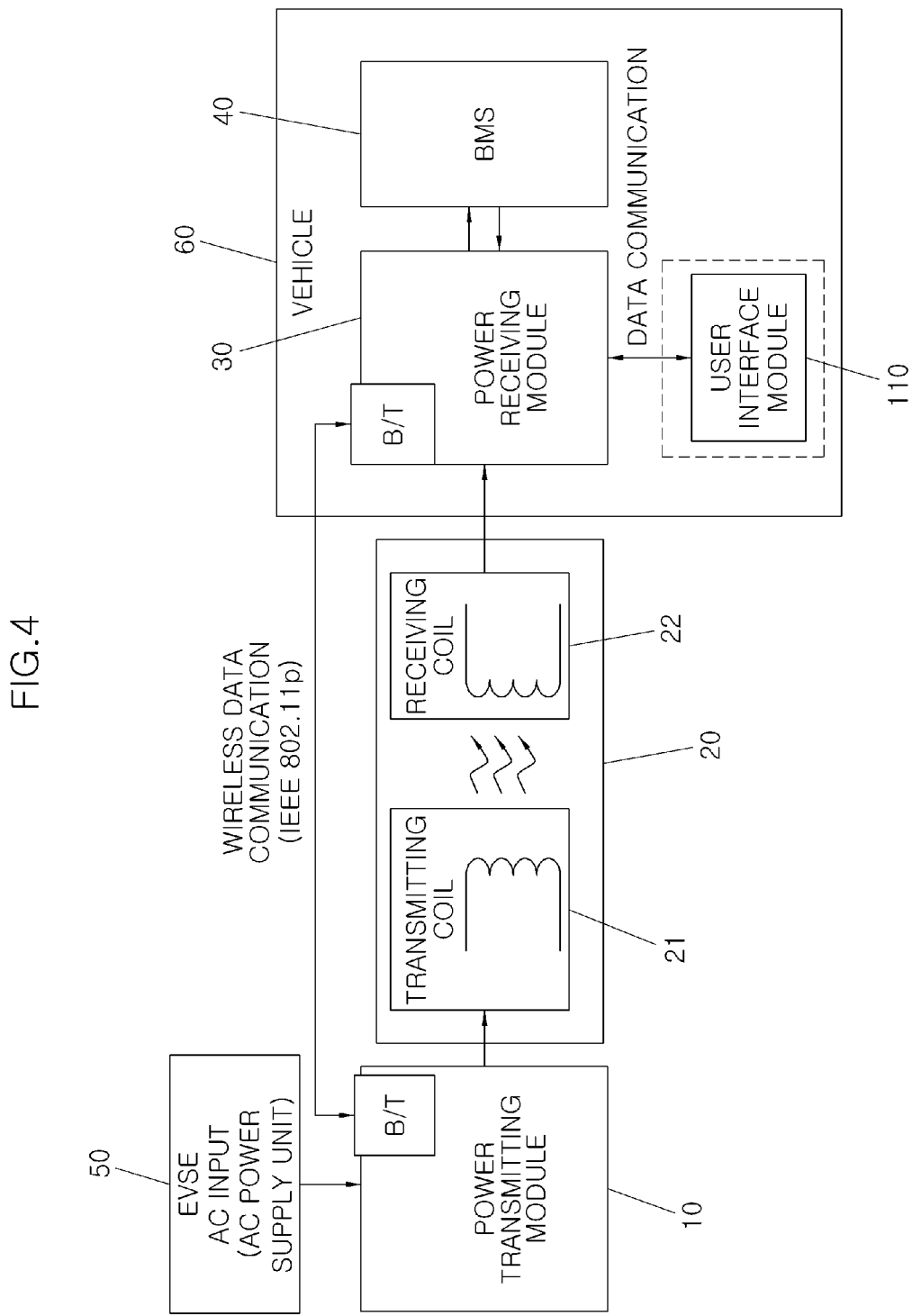
FIG. 4 is a block diagram illustrating a wireless power transmission device.
Figure 7:
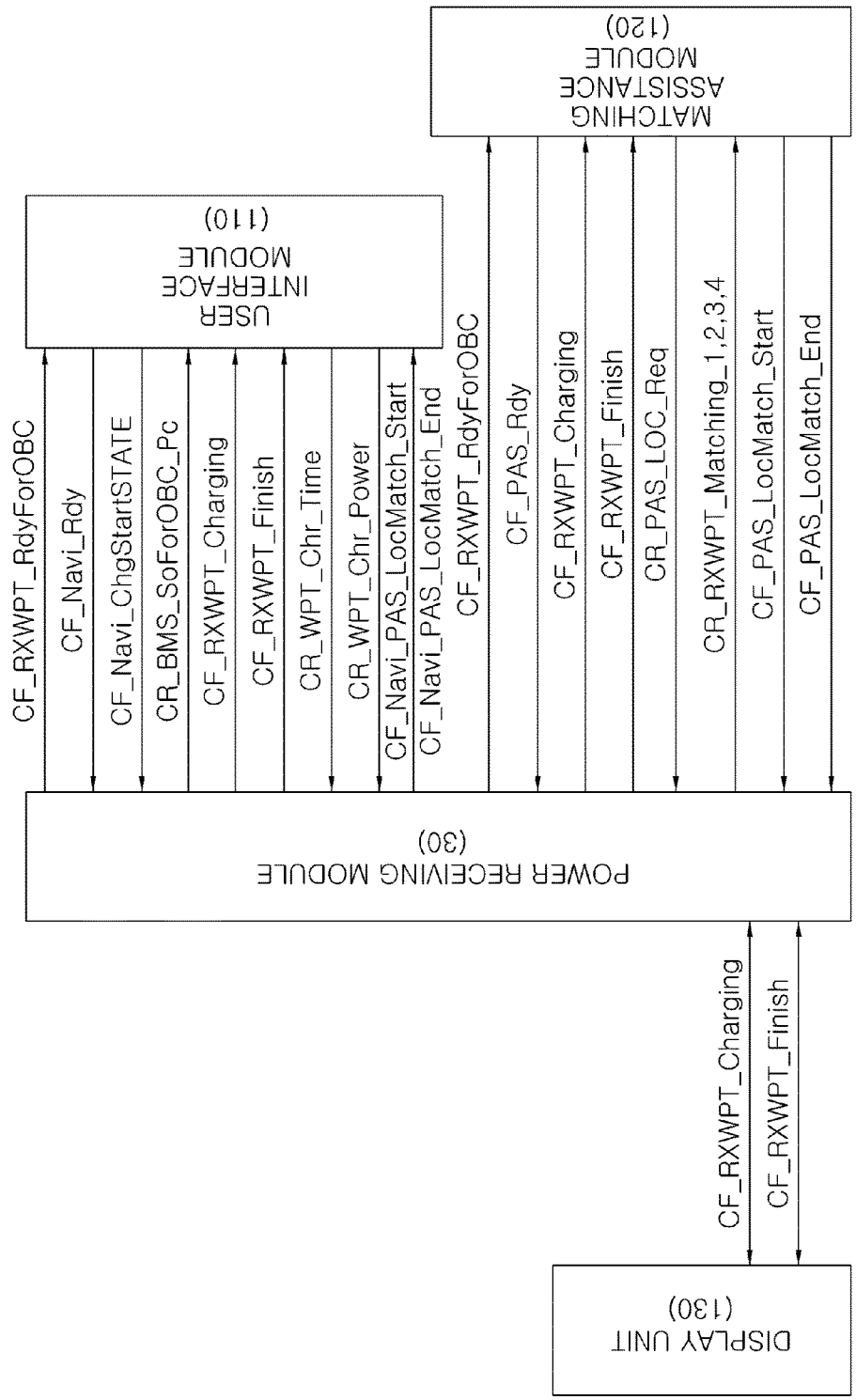
FIG. 7 is a block diagram illustrating data transmission and reception between a power receiving module, a user interface module, a matching assistance unit, and a display unit.

FIG. 4 is a block diagram illustrating an interface of a wireless power transmission. FIG. 7 is a block diagram illustrating data transmission and reception between a power receiving module, a user interface module, a matching assistance unit, and a display unit.

Referring to FIGS. 4 and 7, the wireless power transmission device according to an embodiment of the present application may include a power transmitting module 10, a power receiving module 30, and a user interface module 110 (e.g., a navigation module).

The power transmitting module 10 is installed outside a vehicle for transmitting power. The power receiving module 30 is installed to the vehicle for receiving power from the power transmitting module 10.

The user interface module 110 controls a position of the vehicle and the power transmitting and receiving modules so as to transmit power from the power transmitting module to the power receiving module. That is, the user interface module 110 provides an interface between the power transmitting module 10 and a user.

In more detail, the user interface module 110 displays a position of a transmitting coil 21 connected to the power transmitting module for transmitting power and a position of a receiving coil 22 connected to the power receiving module for receiving power and guides a movement path of the vehicle, thereby enabling the user to drive the vehicle and match the transmitting coil with the receiving coil.

That is, the user interface module 110 may display and guide the movement path of the vehicle such that the user moves the vehicle and matches the receiving coil 22 to the transmitting coil 21. The user interface module 110 may be useful when a matching assistance module 120 to be described later is not included in the wireless power transmission device, and may also be used together with the matching assistance module 120.

In addition, the user interface module 110 may provide an initial screen through which charging by wireless power transmission is selected and an execution screen through which the wireless power transmission is executed.

Here, the user interface module 110 may be a module which performs data communication with the power receiving module 30, and particularly, may be a navigation device for a vehicle.

In particular, the user interface module 110 may perform data communication such that the user controls the power receiving module 30 and charges a vehicle required for electric charging or a vehicle having a high-voltage battery.

In this case, the user interface module 110 may receive power receiving module state information, information on a state of charge or charging progression state information, such as charging quantity/charging time/charging power information, a charging-related command/response, etc., from the power receiving module 30. In addition, the user interface module 110 may transmit state information of the user interface module, a charging start/finish command, a command or response for charging time setting/charging quantity setting/charging power setting, etc., to the power receiving module 30.

In more detail, the user interface module 110 may perform data communication with the power receiving module 30 depending on communication protocols as shown in the following Tables 11 and 12.

TABLE 11

| ID | DATA | PERIOD | DATA BYTE | DATA BIT | STATE VALUE (Example) | FROM | TO | CONTENT |
| --- | --- | --- | --- | --- | --- | --- | --- | --- |
| XX7 | CF_RXWPT_RdyForOBC | 100 ms | 0 | 0 | 1 | Power Receiving Module | User Intreface Module | Power receiving module Ready state (CAN communication in charger, control board preparation) |
| | CF_RXWPT_Charging | | 1 | 1 | | | | Charging display |
| | CF_RXWPT_Finish | | 2 | 1 | | | | Charging finish display |
| | CR_BMS_SoForOBC_Pc | | 1 | 8 | 5~90% | | | Charging quantity display |

In the above Table 11, the XX7 is information transmitted to the user interface module 110 from the power receiving module 30 and is data about the state information of the power receiving module, the charging-related state information, etc.

TABLE 12

| ID | DATA | PERIOD | DATA BYTE | DATA BIT | STATE VALUE (Example) | FROM | TO | CONTENT |
| --- | --- | --- | --- | --- | --- | --- | --- | --- |
| XX8 | CF_Navi_Rdy | 100 ms | 0 | 0 | 1 | User Intreface Module | Power Receiving Module | Navigator Ready state |
| | CF_Navi_ChgStart | | 1 | 1 | | | | Charging start button |
| | CF_Navi_ChgFinished | | 2 | 1 | | | | Charging finish button |
| | CF_Navi_PAS_LocMatch_Start | | 3 | 1 | | | | PAS position correction start |

TABLE 12-continued

| ID | DATA | PERIOD | DATA BYTE | DATA BIT | STATE VALUE (Example) | FROM | TO | CONTENT |
|---|---|---|---|---|---|---|---|---|
| | CF_Navi_PAS_LocMatch_End | | | 4 | 1 | | | PAS position correction finish |
| | CR_WPT_Chr_Time | | 1 | 8 | 0~600 min | | | Charging time setting |
| | | | 2 | 16 | | | | |
| | CR_WPT_Chr_Power | | 3 | 24 | 0~10 KW | | | Charging power setting |
| | | | 4 | 32 | | | | |

In the above Table 12, the XX8 is information transmitted to the power receiving module 30 from the user interface module 110 and is data about charging progression state information of the user interface module, a charging-related command, operation progression state information of the matching assistance module, charging time information, charging power setting information, etc.

When the interface of the wireless power transmission device according to the embodiment of the present application includes only the user interface module 110, data related to a PAS (Parking Assistance System) corresponding to the matching assistance module 120 may not be used in and may be removed from the XX8. On the other hand, when the interface of the wireless power transmission device according to the embodiment of the present application includes another interface or the user interface module 110 performs more functions, necessary data may be added to the XX7 and the XX8.

Data provided to the power receiving module 30 from the power transmitting module 10 according to the communication protocols of the present application depends on the above Tables 1 to 4, similarly to that according to the conventional communication protocols. In addition, data provided to the power transmitting module from the power receiving module 30 according to the communication protocols of the present application depends on the above Tables 5 to 8, similarly to that according to the conventional communication protocols. Furthermore, data mutually provided by the power receiving module 30 and the BMS 40 according to the communication protocols of the present application depends on the above Tables 9 and 10, similarly to that according to the conventional communication protocols.

However, in order to easily classify counterpart modules performing data communication with the power receiving module 30, the XX5 and the XX1 which are data ID mutually provided by the power receiving module 30 and the BMS 40 are changed to the XX5 and the XX6, respectively. Here, the information transmitted to the power receiving module 30 from the power transmitting module 10 may be communication state information of the power transmitting module, a vehicle information-related command of the power transmitting module, charging-related state information, a charging-related command, a BMS information-related command, a power receiving module information-related command, and power transmitting module information. In addition, the information transmitted to the power transmitting module 10 from the power receiving module 30 may be communication state information of the power receiving module, a vehicle information-related response of the power receiving module, charging-related state information, BMS control-related information, power receiving module output-related information, and vehicle and ID-related information.

Hereinafter, a wireless power transmission device for a vehicle according to another embodiment of the present application will be described in more detail with reference to the accompanying drawings.

Figure 5:
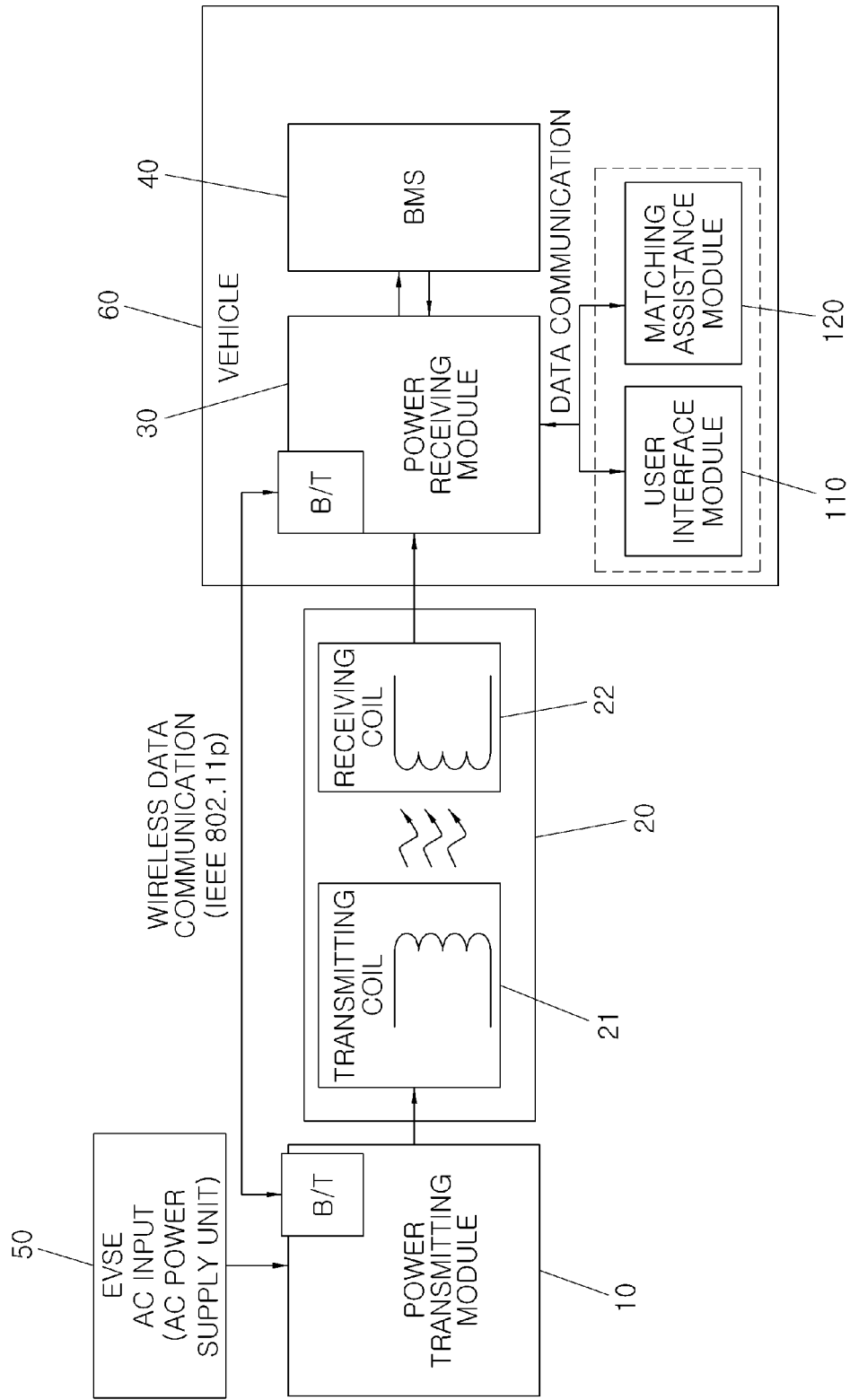
FIG. 5 is a block diagram illustrating a wireless power transmission device.

FIG. 5 is a block diagram illustrating an interface of a wireless power transmission. FIG. 7 is a block diagram illustrating data transmission and reception between a power receiving module, a user interface module, a matching assistance unit, and a display.

Referring to FIGS. 5 and 7, the wireless power transmission device according to another embodiment of the present application may include a power receiving module 30, a user interface module 110, and a matching assistance module 120. Particularly, in the interface of the wireless power transmission device according to another embodiment of the present application, the power receiving module 30 and the user interface module 110 of the present embodiment may be equal to those of another embodiment but may differ in that the matching assistance module 120 is provided therein. That is, the present embodiment further includes the matching assistance module 120 as an interface between the power receiving module 30 and the user. In the present embodiment, the same elements as those of the above-mentioned embodiment are designated by like reference numerals and detailed description thereof will be omitted.

The matching assistance module 120 uses position information of a transmitting coil 21 connected to the power transmitting module 10 for transmitting power and position information of a receiving coil 22 connected to the power receiving module 30 for receiving power to move the vehicle 60, thereby matching the transmitting coil 21 with the receiving coil 22. That is, the matching assistance module 120 moves the vehicle 60 equipped with the receiving coil 22 to charge a high-voltage battery and the like of the vehicle 60, thereby matching the receiving coil 22 to the transmitting coil 21 installed outside the vehicle. In this case, the transmitting coil 21 should be accurately matched with receiving coil 22 in order to efficiently charge the vehicle 60 equipped with the high-voltage battery and the like.

Figure 1B:
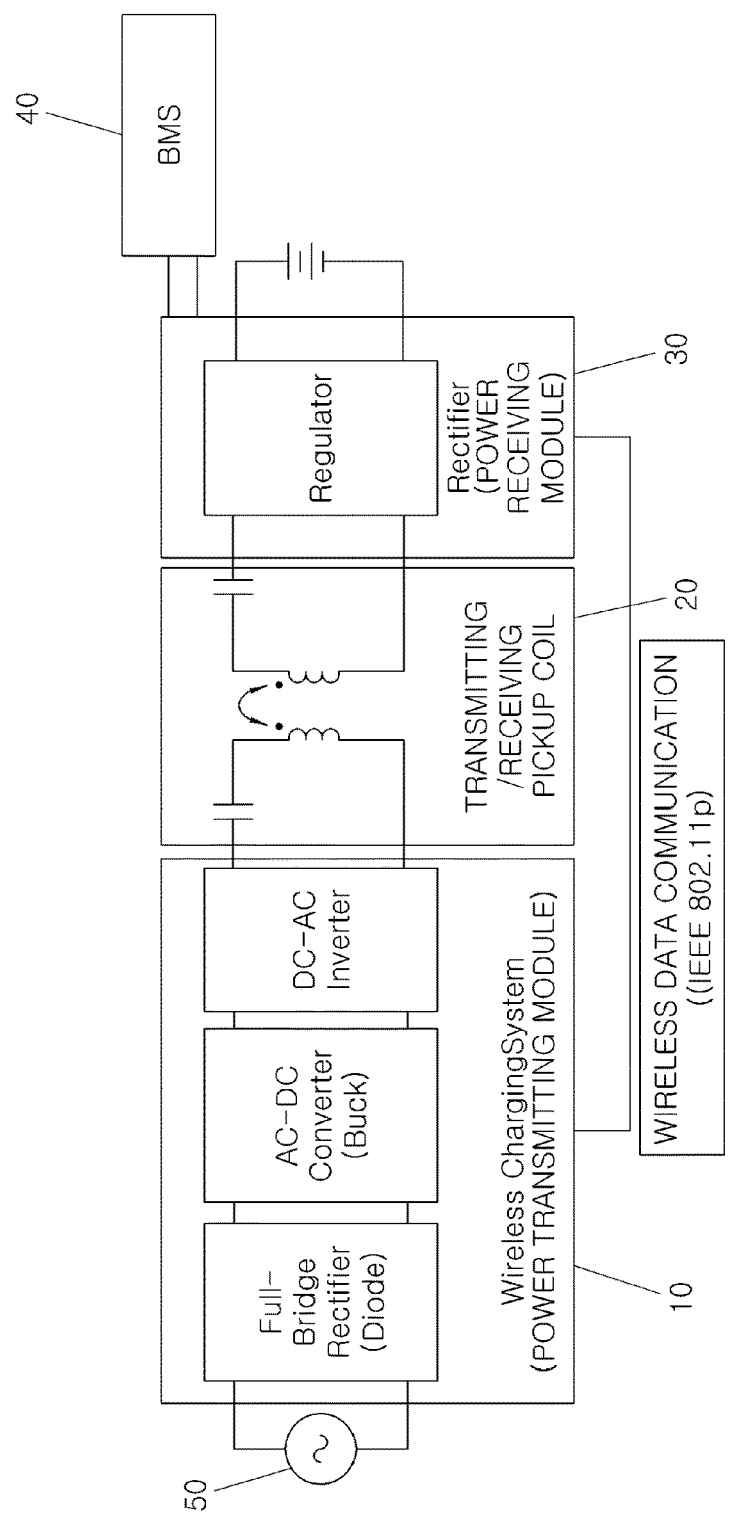
Figure 3:
FIG. 3 is a block diagram illustrating data transmission and reception between a power transmitting module, a power receiving module, and a BMS according to the related art.

The reason is that the transmitting coil 21 occupies a predetermined area on the ground as illustrated in FIG. 1 and thus the vehicle 60 is appropriately moved to accurately match the receiving coil 22 installed to the vehicle with the transmitting coil 21 on the ground so as to increase the power transmission efficiency of the wireless power transmission device 1.

In addition, the matching assistance module 120 may automatically move the vehicle 60 to match the position of the transmitting coil 21 with the position of the receiving coil 22. Here, the matching assistance module 120 may be a module which performs data communication with the power receiving module 30 while controlling the movement of the vehicle 60, and particularly, may be a PAS (Parking Assistance System).

In particular, the matching assistance module 120 may receive power receiving module state information, charging-related state information, a command/response for vehicle position-related information or vehicle movement coordinate information, etc., from the power receiving module 30. In addition, the matching assistance module 120 may transmit matching assistance module state-related information, charging-related state information, a command/response for vehicle position-related information or vehicle movement coordinate information, etc., to the power receiving module 30.

In more detail, the matching assistance module 120 may perform data communication with the power receiving module 30 depending on communication protocols as shown in the following Tables 13 and 14.

TABLE 13

| ID | DATA | PERIOD | DATA BYTE | DATA BIT | STATE VALUE (Example) | FROM | TO | CONTENT |
|---|---|---|---|---|---|---|---|---|
| XX9 | CF_RXWPT_RdyForOBC | 100 ms | 0 | 0 | 1 | Power Receiving Module | PAS | Power receiving module Ready state (CAN communication in charger, control board preparation) |
| | CF_RXWPT_Charging | | 1 | 1 | | | | Charging display |
| | CF_RXWPT_Finish | | 2 | 1 | | | | Charging finish display |
| | CR_RXWPT_Matching_1 | | 1 | 8 | 0~50 cm | | | Vehicle position coordinate correction (front) |
| | CR_RXWPT_Matching_2 | | 2 | 16 | 0~50 cm | | | Vehicle position coordinate correction (rear) |
| | CR_RXWPT_Matching_3 | | 3 | 24 | 0~50 cm | | | Vehicle position coordinate correction (left) |
| | CR_RXWPT_Matching_4 | | 4 | 32 | 0~50 cm | | | Vehicle position coordinate correction (right) |
| | CR_Matching_info | | 5 | 40 | 3 | | | Vehicle movement ok/nok/re-movement |

In the above Table 13, the XX9 is information transmitted from the power receiving module 30 and is data about the state information of the power receiving module, the charging progression state information, the vehicle position movement coordinate information, the check information when the vehicle moves, etc.

TABLE 14

| ID | DATA | PERIOD | DATA BYTE | DATA BIT | STATE VALUE (Example) | FROM | TO | CONTENT |
|---|---|---|---|---|---|---|---|---|
| XXA | CF_PAS_Rdy | 100 ms | 0 | 0 | 1 | PAS | Power Receiving Module | PAS Ready state information |
| | CF_PAS_ChgStart | | 1 | 1 | | | | Charging start information |
| | CF_PAS_ChgFinished | | 2 | 1 | | | | Charging finish information |
| | CR_PAS_LOC_Req | | 3 | 1 | | | | Movement coordinate information request |

TABLE 14-continued

| ID | DATA | PERIOD | DATA BYTE | BIT | STATE VALUE (Example) | FROM | TO | CONTENT |
|---|---|---|---|---|---|---|---|---|
| | CF_PAS_LocMatch_Start | | 4 | 1 | | | | Vehicle movement start |
| | CF_PAS_LocMatch_End | | 5 | 1 | | | | Vehicle movement end |

In the above Table 14, the XXA is information transmitted from the matching assistance module 120 and is data about the state information of the matching assistance module, the charging progression state information, the vehicle movement coordinate information request, the vehicle movement progression state information, etc. In addition, when the interface of the wireless power transmission device according to the embodiment of the present application includes another interface or the matching assistance module 120 performs more functions, necessary data may be added to the XX9 and the XXA.

Since the power receiving module 30 and the user interface module 110 of the present embodiment are equal to those of the interface of the wireless power transmission device for a vehicle according to the above-mentioned embodiment, detailed description thereof will be omitted.

Hereinafter, a wireless power transmission device for a vehicle according to another embodiment of the present application will be described in more detail with reference to the accompanying drawings.

Figure 6:
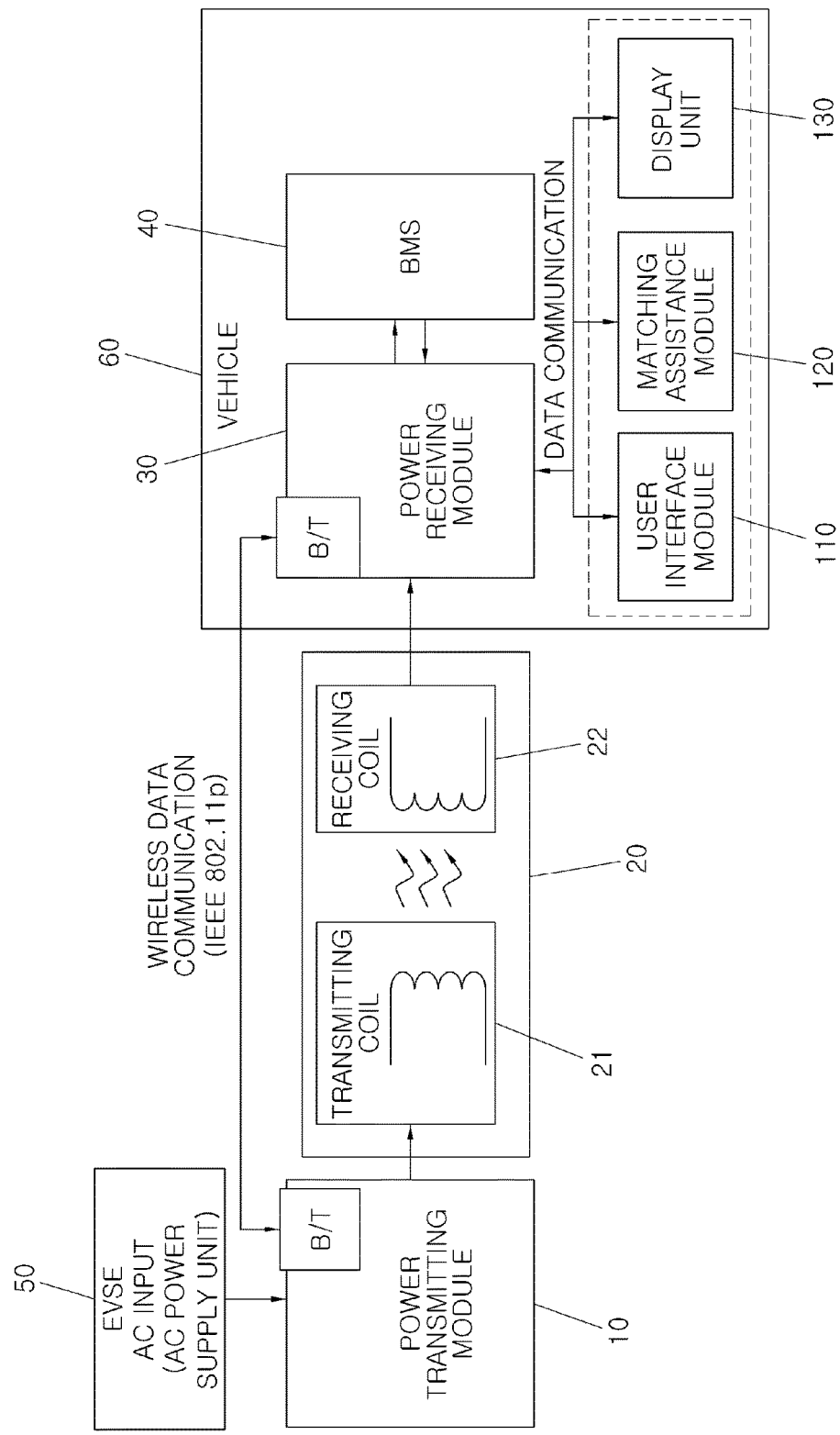
FIG. 6 is a block diagram illustrating a wireless power transmission device

FIG. 6 is a block diagram illustrating an interface of a wireless power transmission device. FIG. 7 is a block diagram illustrating data transmission and reception between a power receiving module, a user interface module, a matching assistance unit, and a display unit.

Referring to FIGS. 6 and 7, the wireless power transmission device according to another embodiment of the present application may include a power receiving module 30, a user interface module 110, a matching assistance module 120 (e.g., corresponding to a (PAS), and a display unit 130. Particularly, in the interface of the wireless power transmission device according to another embodiment of the present application, the power receiving module 30, the user interface module 110, and the matching assistance module 120 of the present embodiment may be equal to those of another embodiment but the present embodiment may differ in that the display unit 130 is provided therein. In the present embodiment, the same elements as those of the above-mentioned embodiment are designated by like reference numerals and detailed description thereof will be omitted.

The display unit 130 may display a charging progression state by the wireless power transmission device. Here, the display unit 130 may be a unit which displays charging or charging finish, and particularly, may be a cluster.

Particularly, when the charging starts by the user interface module 110, the display unit 130 may display a charging quantity, a charging progression state, and a charging finish status, etc. by the user interface module 110. In this case, the display unit 130 may receive charging state or charging progression state information, etc., from the power receiving module 30, and may transmit a portion of the functions of the user interface module 110, for example, a command/response for charging start/charging time setting/charging quantity setting/charging power setting, etc.

In more detail, the display unit 130 may perform data communication with the power receiving module 30 depending on communication protocols as shown in the following Table 26.

TABLE 26

| ID | DATA | PERIOD | DATA BYTE | BIT | STATE VALUE (Example) | FROM | TO | CONTENT |
|---|---|---|---|---|---|---|---|---|
| XXB | CF_RXWPT_Charging | 100 ms | 0 | 0 | 1 | Power Receiving Module | CLUSTER | Charging display |
| | CF_RXWPT_Finish | | | 1 | 1 | | | Charging finish display |

In the above Table 26, the XXB is information transmitted from the power receiving module and is data about charging progression state information, etc. In addition, when the interface of the wireless power transmission device according to the embodiment of the present application includes another interface or the display unit 130 performs more functions, necessary data may be added to the XXB.

Since the power receiving module 30, the user interface module 110, and the display unit 130 of the present embodiment are equal to those of the interface of the wireless power transmission device for a vehicle according to the above-mentioned embodiment, detailed description thereof will be omitted.

Hereinafter, a charging method of a vehicle through an interface of a wireless power transmission device according to an embodiment of the present application will be described in more detail with reference to the accompanying drawings.

Figure 8:
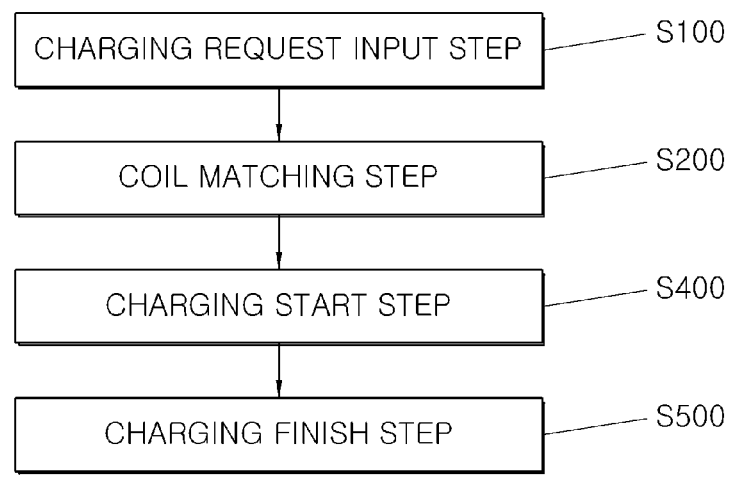
FIG. 8 is a conceptual flowchart illustrating a charging method of a vehicle through an interface of a wireless power transmission.
Figure 9:
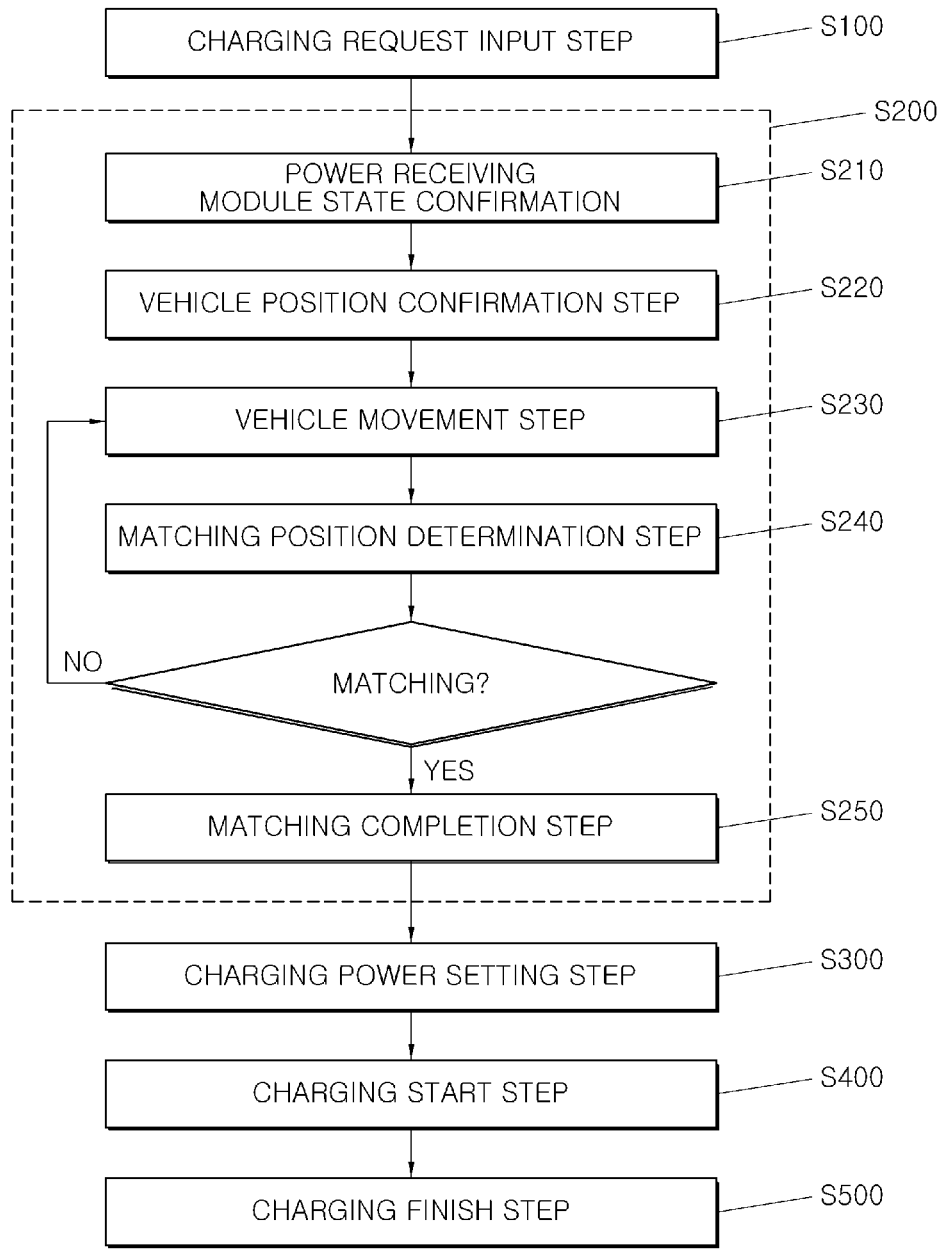
FIG. 9 is a flowchart illustrating an example of a charging method of a vehicle through an interface of the wireless power transmission.

FIG. 8 is a conceptual flowchart illustrating a charging method of a vehicle through an interface of a wireless power transmission device. FIG. 9 is a flowchart illustrating an example of a charging method of a vehicle through an interface of a wireless power transmission device.

Referring to FIGS. 8 and 9, the charging method of a vehicle through the interface of the wireless power transmission device according to the embodiment of the present application may include a charging request input step S100, a coil matching step S200, a charging power setting step S300, a charging start step S400, and a charging finish step S500.

In the charging request input step S100, a user interface module 110 receives a charging request for a vehicle. That is, in the charging request input step S100, a user may input the charging request for a vehicle through the user interface module 110. When the charging request is input to the user interface module 110 by the user, processes to be described later may proceed in order to charge a vehicle having a high-voltage battery and the like. In the charging request input step S100, the data communication may be performed depending on the communication protocols XX7 and XX8 as shown in the above Tables 11 and 12.

The coil matching step S200 moves the vehicle 60 using position information of a transmitting coil 21 installed outside the vehicle and position information of a receiving coil 22 installed to the vehicle, thereby matching the transmitting coil 21 with the receiving coil 22. In more detail, in the coil matching step S200, a matching assistance module 120 moves the vehicle 60 using a position of the transmitting coil 21 installed on the ground and a position of the receiving coil 22 installed to the vehicle, thereby matching the transmitting coil 21 with the receiving coil 22. In addition, in the coil matching step S200, a user interface module 110 displays the position of the transmitting coil 21 and the position of the receiving coil 22 and guides a movement path of the vehicle, thereby enabling the user to drive the vehicle and match the transmitting coil 21 with the receiving coil 22. Here, the position of the transmitting coil 21 may be automatically input by the matching assistance module 120 or be manually input by the user interface module 110. Here, in the coil matching step S200, the data communication may be performed depending on the communication protocols XX7, XX8, XX9, and XXA as shown in the above Tables 11 to 14.

In more detail, the coil matching step S200 may include a power receiving module state confirmation step S210, a vehicle position confirmation step S220, a vehicle movement step S230, a matching position determination step S240, and a matching completion step S250. Here, in the power receiving module state confirmation step S210, the vehicle position confirmation step S220, the vehicle movement step S230, the matching position determination step S240, and the matching completion step S250, the data communication may be performed depending on the communication protocols XX7, XX8, XX9, and XXA as shown in the above Tables 11 to 14.

In the power receiving module state confirmation step S210, the matching assistance module 120 receives state information of the power receiving module from the power receiving module 30. That is, the power receiving module state confirmation step S210 is a step of confirming a charging preparation state of the power receiving module 30.

In the vehicle position confirmation step S220, the matching assistance module 120 receives a position of the vehicle from the power receiving module 30. In more detail, in the vehicle position confirmation step S220, the matching assistance module 120 may receive front, rear, left, and right position coordinates of the vehicle from the power receiving module 30 so as to specify the current position of the vehicle 60 and the position of the receiving coil 22 installed to the vehicle 60.

In the vehicle movement step S230, the vehicle is moved. In more detail, in the vehicle movement step S230, the matching assistance module 120 may move the vehicle using the position information of the transmitting coil 21 and the position information of the receiving coil 22. In addition, in the vehicle movement step S230, the user interface module 110 displays the position of the transmitting coil 21 and the position of the receiving coil 22 and guides the movement path of the vehicle, thereby enabling the user to move the vehicle. Here, the position of the transmitting coil 21 may be automatically input by the matching assistance module 120 or be manually input by the user interface module 110.

In the matching position determination step S240, the matching assistance module 120 receives the position of the moving vehicle from the power receiving module 30 and determines whether the position of the vehicle 60 is a position at which the transmitting coil 21 is matched with the receiving coil 22. In more detail, in the matching position determination step S240, the matching assistance module 120 may compare the position of the transmitting coil 21 installed outside the vehicle with the position of the receiving coil 22 installed to the moving vehicle and determine a matching status and matching degree of the transmitting coil 21 and the receiving coil 22. In addition, in the matching position determination step S240, it may be possible to determine a matching status and matching degree of the transmitting coil 21 and the receiving coil 22 by comparing the position of the transmitting coil 21 with the position of the receiving coil 22 installed to the vehicle moving according to guidance of the vehicle movement path of the user interface module 110. In the matching position determination step S240, the matching position may be determined based on the matching status and matching degree of the transmitting coil 21 and the receiving coil 22, and particularly, may be determined under a condition in which the transmitting coil 21 is matched with the receiving coil 22 to the extent of more than 90%.

In the matching completion step S250, when the position of the vehicle 60 is a position at which the transmitting coil 21 is matched with the receiving coil 22, the movement of the vehicle is stopped. That is, in the matching completion step S250, after the transmitting coil 21 is matched with the receiving coil 22, the vehicle 60 may be stopped for charging.

In the charging power setting step S300, the user interface module 110 receives charging power or charging time for the vehicle. That is, in the charging power setting step S300, the user may input a charging quantity for charging the vehicle, namely, charging power and charging time through the user interface module 110. The charging power setting step S300 may not be performed as occasion demands, but the present embodiment includes the charging power setting step S300. Here, in the charging power setting step S300, the data communication may be performed depending on the communication protocols XX7 and XX8 as shown in the above Tables 11 and 12.

In the charging start step S400, the user interface module 110 receives a charging start request for the vehicle. That is, in the charging start step S400, the user may input the charging start request for the vehicle through the user interface module 110. Here, in the charging start step S400, the data communication may be performed depending on the communication protocols XX7, XX8, XX9, and XXA as shown in the above Tables 11 to 14.

In the charging finish step S500, the charging of the vehicle 60 is finished. In more detail, in the charging finish step S500, when the vehicle 60 is fully charged, the charging of the vehicle may be finished. In addition, in charging finish step S500, the user interface module 110 may receive a charging finish request for the vehicle. That is, in the charging finish step S500, the user may arbitrarily input the charging finish request for the vehicle through the user interface module 110. Accordingly, the user may finish the charging of the vehicle at any time. Here, in the charging finish step S500, the data communication may be performed depending on the communication protocols XX7, XX8, XX9, and XXA as shown in the above Tables 11 to 14.

In any step, the data communication may be performed depending on the communication protocol XXB as shown in the above Table 26. In addition, in any step, the data communication may be performed depending on the communication protocols as shown in the above Tables 1 to 14.

In accordance with a wireless power transmission device for a vehicle of embodiments of the present application, a user can easily charge a vehicle.

In addition, the wireless power transmission device for a vehicle of embodiments of the present application can increase transmission efficiency between a receiving coil and a transmitting coil so as to efficiently charge the vehicle.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. A wireless power transmission device, comprising:
   a power receiving module installed on a vehicle and configured to receive power from a power transmitting module;
   a user interface module configured to control a position of the vehicle, the power transmitting module, and the power receiving module so as to transmit power from the power transmitting module to the power receiving module; and
   a display unit configured to display a charging progression state of the wireless power transmission device,
   wherein information transmitted from the power receiving module to the display unit comprises information about the charging progression state and state information of the power receiving module and the power transmitting module.

2. The device of claim 1, wherein information transmitted from the power receiving module to the user interface module comprises state information about the power receiving module and charging-related state information.

3. The device of claim 1, wherein information transmitted from the user interface module to the power receiving module comprises state information of the user interface module, a charging-related command, operation-related information of a matching assistance module, and charging-related setting information.

4. The device of claim 1, wherein the user interface module is further configured to display a position of a transmitting coil connected to the power transmitting module and a position of a receiving coil connected to the power receiving module, and guide a movement path of the vehicle so as to allow a user to drive the vehicle to match a position of the transmitting coil with a position of the receiving coil.

5. The device of claim 1, wherein the user interface module is further configured to provide an initial screen through which charging by wireless power transmission is selected, and an execution screen through which the wireless power transmission is executed.

6. The device of claim 1, wherein the user interface module comprises a navigation device for the vehicle.

7. The device of claim 1, further comprising a matching assistance module configured to move the vehicle using position information of a transmitting coil connected to the power transmitting module and position information of a receiving coil connected to the power receiving module, to match a position of the transmitting coil with a position of the receiving coil.

8. The device of claim 7, wherein information transmitted from the power receiving module to the matching assistance module comprises state information about the power receiving module, charging progression state information, vehicle position-related information, and vehicle movement-related check information.

9. The device of claim 7, wherein information transmitted from the matching assistance module to the power receiving module comprises state information of the matching assistance module, charging progression state information, vehicle position-related commands and information, and vehicle movement progression state-related information.

10. The device of claim 7, wherein the matching assistance module is further configured to automatically move the vehicle to match the position of the transmitting coil with a position of the receiving coil.

11. The device of claim 7, wherein the matching assistance module comprises a PAS (Parking Assistance System).

12. The device of claim 1, wherein the display unit comprises a cluster.

13. The device of claim 1, wherein
   information transmitted from the power transmitting module to the power receiving module comprises communication state information of the power transmitting module, a vehicle information-related command of the power transmitting module, charging-related state information, a charging-related command, a Battery Management System (BMS) information-related commands, a power receiving module information-related command, and information of the power transmitting modulo; module, and
   information transmitted from the power receiving module to the power transmitting module comprises communication state information of the power receiving module, a vehicle information-related response of the power receiving module, other charging-related state information, BMS control-related information, power receiving module output-related information, and vehicle and ID-related information.

14. A method for controlling a wireless power transmission device, the method comprising:
   receiving, from a user interface module, a charging request for a vehicle;
   moving the vehicle using position information of a transmitting coil installed outside of the vehicle and position information of a receiving coil installed on the vehicle so as to match a position of the transmitting coil with a position of the receiving coil;

charging the vehicle, in response to receiving a charging start request for the vehicle;

transmitting, from a power receiving module to a display unit, information about a charging progression state of the wireless power transmission device and state information of the power receiving module and a power transmitting module; and displaying, by the display unit, the charging progression state of the wireless power transmission device, wherein the power transmission module is connected to the transmitting coil and the power receiving module is connected to the receiving coil.

15. The method of claim 14, wherein the moving of the vehicle comprises moving the vehicle autonomously or displaying, by the user interface module, the position of the transmitting coil and the position of the receiving coil, and guiding a movement path of the vehicle to match the position of the transmitting coil with the position of the receiving coil.

16. The method of claim 15, wherein the moving of the vehicle comprises automatically inputting the position of the transmitting coil by the matching assistance module, or receiving input from the user interface module.

17. The method of claim 15, wherein the moving of the vehicle comprises receiving, by the matching assistance module, from the power receiving module, state information of the power receiving module, receiving, by the matching assistance module, from the power receiving module, a position of the vehicle, moving the vehicle, receiving, by the matching assistance module, from the power receiving module, a position of the vehicle so as to determine whether the position of the transmitting coil is matched with the position of the receiving coil, and stopping movement of the vehicle, in response to the position of the transmitting coil matching the position of the receiving coil.

18. The method of claim 17, further comprising moving the vehicle again, in response to the position of the transmitting coil not matching with the position of the receiving coil.

19. The method of claim 14, further comprising receiving, by the user interface module, charging power information or charging time information, before the charging of the vehicle, and discontinuing the charging of the vehicle, in response to the user interface module receiving a charging finish request.

20. A wireless power transmission device, the device comprising:

a power receiving module installed on a vehicle for receiving power from a power transmitting module; and a user interface module configured to control a position of the vehicle, the power transmitting module, and the power receiving module so as to transmit power from the power transmitting module to the power receiving module, wherein information transmitted from the power transmitting module to the power receiving module comprises communication state information of the power transmitting module, a vehicle information-related command of the power transmitting module, charging-related state information, a charging-related command, a Battery Management System (BMS) information-related command, a power receiving module information-related command, and information of the power transmitting module, and wherein information transmitted from the power receiving module to the power transmitting module comprises communication state information of the power receiving module, a vehicle information-related response of the power receiving module, charging-related state information, BMS control-related information, power receiving module output-related information, and vehicle and ID-related information.

* * * * *